United States Patent [19]

McKay

[11] E Re. 29,363

[45] Reissued * Aug. 23, 1977

[54] FALSE-TWIST TEXTURING YARN OF POLYESTER FILAMENTS HAVING MULTILOBAL CROSS SECTIONS

[75] Inventor: Jerry Bruce McKay, Kinston, N.C.

[73] Assignee: E. I. Du Pont de Nemours and Company, Wilmington, Del.

[ * ] Notice: The portion of the term of this patent subsequent to Sept. 19, 1989, has been disclaimed.

[21] Appl. No.: 631,128

[22] Filed: Nov. 11, 1975

Related U.S. Patent Documents

Reissue of:

[64] Patent No.: 3,846,969
Issued: Nov. 12, 1974
Appl. No.: 393,167
Filed: Aug. 30, 1973

U.S. Applications:

[63] Continuation-in-part of Ser. No. 243,795, April 13, 1972, abandoned, which is a continuation-in-part of Ser. No. 99,446, Dec. 18, 1970, abandoned.

[51] Int. Cl.[2] ..... D02G 3/02; D02G 1/02

[52] U.S. Cl. ..... 57/140 J; 57/157 TS; 260/75 R; 428/397

[58] Field of Search ..... 57/157 R, 157 TS, 140 R, 57/140 J, 79 HS; 428/362, 369, 397–400; 260/75 R, 78 R; 264/177 R, 177 F, 167, 168

[56] References Cited

U.S. PATENT DOCUMENTS

| | | | |
|---|---|---|---|
| 2,939,201 | 6/1960 | Holland | 57/140 J X |
| 2,959,839 | 11/1960 | Craig | 428/397 |
| 3,156,607 | 11/1964 | Strachan | 428/397 |
| 3,216,186 | 11/1965 | Opfell | 57/140 J |
| 3,287,888 | 11/1966 | Chidgey | 57/34 HS |
| 3,425,893 | 2/1969 | Sims | 428/397 |
| 3,508,390 | 4/1970 | Bagmall et al. | 57/140 J |
| 3,691,749 | 9/1972 | McKay | 57/140 J |

FOREIGN PATENT DOCUMENTS

| | | | |
|---|---|---|---|
| 936,729 | 9/1963 | United Kingdom | |
| 1,043,543 | 6/1966 | United Kingdom | 57/140 J |

*Primary Examiner*—John Petrakes

[57] ABSTRACT

Multifilament polyester yarn, of multilobal filaments having specified cross-sectional characteristics, is false-twist textured into yarn which provides fabrics having improved visual aesthetics. The examples illustrate that freedom from objectionable glitter is obtained with 6 to 10-lobed filaments, having essentially symmetric lobes of equal length equispaced around a central axis of the filament, when the modification ratio is from 1.17 to 1.85, and the denier per filament is between 3.8 and a maximum value which is a function of the modification ratio and the number of lobes.

10 Claims, 1 Drawing Figure

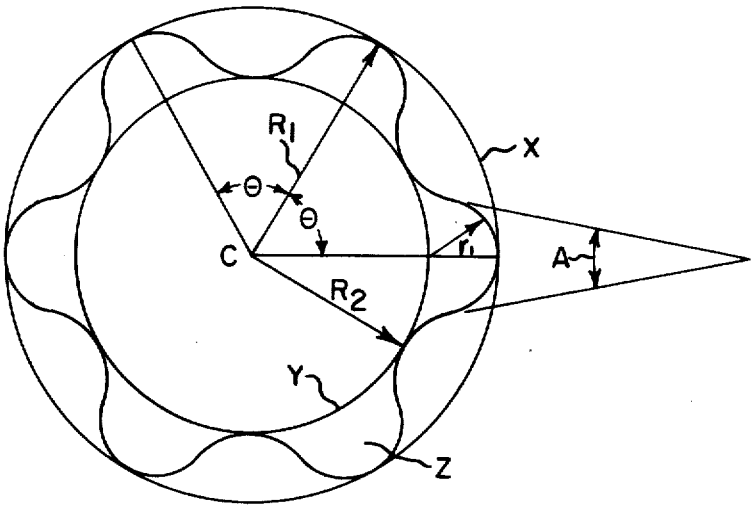
R1
X
Θ
Θ
C
r1
A
R2
Y
Z

FALSE-TWIST TEXTURING YARN OF POLYESTER FILAMENTS HAVING MULTILOBAL CROSS SECTIONS

Matter enclosed in heavy brackets [ ] appears in the original patent but forms no part of this reissue specification; matter printed in italics indicates the additions made by reissue.

REFERENCE TO RELATED APPLICATIONS

This is a continuation-in-part of application Ser. No. 243,795, filed Apr. 13, 1972 (now abandoned), which is in turn a continuation-in-part of application Ser. No. 99,446, filed Dec. 18, 1970, now abandoned.

BACKGROUND OF THE INVENTION

1. Field of the Invention

The invention relates to false-twist textured yarns made from continuous filaments having modified cross-sections, and is more particularly concerned with polyester yarns which can be false-twist textured for use in fabrics having improved visual aesthetics.

2. Description of the Prior Art

Apparel fabrics knitted or woven from false-twist textured, continuous filament synthetic yarns are finding increasing acceptance in the trade. The texturing is needed to eliminate the undesirable slickness of fabrics made from synthetic filaments. The fabric aesthetics can be further improved by using fibers having a modified (i.e., non-round) cross-section which lead to higher bulk, a crisper and drier hand, better cover, and a pleasing subdued luster. Unfortunately, fabrics produced from false-twist textured yarns often have an undesirable glitter or sparkle, i.e., reflection of light in intense beams from tiny areas of the fabrics. Except for certain novelty applications, this glitter is highly objectionable and detracts from the appearance of the fabric, particularly when the fabric is dyed in dark shades.

A variety of methods are used to texture filaments depending on the use of the yarn. One which has met with considerable [commerical] *commercial* success is false-twist texturing. In this process the yarn is twisted, heat-set in the twisted configuration as it approaches a spindle or other twist trap, and then untwisted as it released from the spindle or twist trap. The released yarn has a tendency to resume its twisted shape, thus causing the filaments to become crimped and looped, thereby creating bulk and elasticity in the yarn. Under the conditions normally used to false-twist texture yarns, i.e., with high twist levels and temperatures above the softening point, the individual filaments in the twisted hot yarn become distorted, tending to form flat surfaces with reflect light in intense beams which are observed as glitter in fabrics prepared from these yarns. It has been found that when more than about 12 percent of the filaments in a multifilament textured yarn have cross-sections with a flattened periphery greater than 10 microns in length, fabrics produced from these textured yarns will exhibit objectionable glitter. The flattening of filaments can be observed in transverse cross-sectional slices of the yarn under a microscope.

The subject of glitter in fabrics made from untextured yarns has been discussed in the prior art and means for reducing this glitter have been suggested. For example, Strachan U.S. Pat. No. 3,156,607 discloses fibers having oblong cross-sections of specified geometry which provide a combination of desirable properties including a low sparkle. One example describes the preparation of polyethylene terephthalate yarns (3 denier/filament) with a hexalobal oblong cross-section, which are crimped in a stuffing box, cut into staple and formed by conventional means into a fabric which is free from objectionable glitter. Craig U.S. Pat. No. 2,959,839 describes polyester fibers having corrugated cross-section which are formed into staple yarns and produce fabrics which are free of glitter.

Sims U.S. Pat. No. 3,425,893 discloses that the luster of trilobal filaments is improved when the lobes are substantially uniformly bent in one direction along the length of the filaments, and that better aesthetic properties are obtained in sheer fabrics with five-, seven-, and nine-lobed skewed filaments.

The problem of reducing the size of flat surface deformation sufficiently to overcome objectionable glitter is particularly serious when false-twist texturing multifilament textile yarn of polyester filaments. This problem is more easily overcome with 6—6 nylon filaments, which have better recovery from such deformation during false-twist texturing. The problem is also more easily overcome when the filaments are of low denier, but fine denier filaments provide fabrics which are generally less desirable because they are too soft and lack crispness.

SUMMARY OF THE INVENTION

The invention provides falst-twist textured yarns comprising polyester filaments of recognizable multilobal cross-section having deviations from pure symmetry. The total number of lobes (N) is 6 to 10, the modification ratio (M) is between 1.17 and 1.85 (determined from the feed yarn), and the filament denier is more than 3.8 and less than $(5.88M-10+N)$. Less than 12 percent of the filaments have cross-sections with a flattened periphery greater than 10 microns.

The invention further provides feed yarns for use in the texturing process to prepare the described textured yarns. The feed yarns comprise polyester filaments which have multilobal cross-section with 6 to 10 lobes which are essentially symmetric, of substantially equal length and equispaced radially about the center of the filament. The fully drawn filaments are further characterized by a denier per filament more than 3.8 and less [then] *than* $5.88M-(10-[\,]]N)$ where M is the modification ratio and N is the number of lobes.

[The invention also provides feed yarns for draw-texturing where the yarn is drawn and textured in a unitary operation. These feed yarns comprise partially oriented polyester filaments which have multilobal cross-sections with 6 to 10 lobes which are essentially symmetric, of substantially equal length, and equispaced radially about the center of the filament. These partially oriented filaments are further characterized by a denier per filament between 3.8(R) and $(5.88M-10+N)$ (R) where (R) is the maximum ratio of output to input in the draw-texturing operation which is operable without excessive filament breakage. The value of (R) depends upon the extent of orientation and may have a value up to 6. For highly oriented filaments where R has a value of substantially 1, the above formulas indicate that the denier per filament is between 3.8 and $5.88M-10+N$, as in the preceding paragraph.]

Because the amount of cross-section flattening is minimized, fabrics prepared from the textured yarns' are free from objectionable glitter.

Preferred polyesters are polyethylene terephthalate and an ethylene terephthalate copolyester containing about 2 mole percent of 5-sodium-sulfo-isophthalate units in the polymer chain. An octalobal cross-section is generally preferred. *The polyester filaments preferably have a finish which provides a friction coefficient of less than 0.3 at the texturing temperature.*

BRIEF DESCRIPTION OF THE DRAWING

The single FIGURE of the drawing is a schematic representation of the cross section of a hexalobal filament.

DETAILED DISCLOSURE

"Modification ratio" as used herein is defined with reference to FIG. 1 as $R_1/R_2$, where $R_1$ is the radius of circle X having center "C" circumscribed about the tips of the lobes Z, and $R_2$ is the radius of circle Y having center C inscribed within the cross-section.

The term "essentially symmetric lobes" means that a line joining the lobe tip to center C of circle Y will bisect the lobe area located above circle Y into two approximately equal areas which are essentially mirror images of one another.

By "lobes equispaced radially" is meant that a line joining a lobe tip to center C of circle X will be at an approximately constant angle $\theta$ from the line joining the tip of the adjacent lobe to point C. When the lobes are appreciably non-symmetrical and/or the angles $\theta$ are not approximately constant, this will produce a "weak" point in the filament cross-section which will be more likely to produce a flat surface during texturing.

The term "equal length" when applied to lobes means that in a cross-sectional photomicrograph a circle can be constructed which passes through the margins of each of the tips of the lobes. Small variations from perfect symmetry generally occur in any spinning process due to such factors as non-uniform quenching or imperfect spinning orifices.

It is to be understood that such variations are permissible provided that they are not of sufficient size to cause glitter in fabrics after texturing.

Upon examination of FIG. 1, it should be evident that filaments of a given modification ratio may have a variety of cross sections. For example, while the tips of the lobes generally assume a circular configuration, this circle outlining the tip of the lobe may have a high or low tip radius, $r_1$, relative to the circumscribing radius, $R_1$, of the cross section. In addition, the lobe angle, A, formed by two tangents laid at the points of inflection of curvature on each side of the lobe, may be either negative or positive. The lobe angle, A, is considered to be positive when the two tangents converge outside of the cross section on the same side of the fiber as the lobe. A positive lobe angle, A, is indicated in FIG. 1. Lobe angles which are positive are especially preferred in the feed yarns of the invention, for lobes of this type are less likely to flatten in texturing.

*Friction coefficient is determined against an AlSiMag® 513 pin 3/16 inch in diameter (Moh hardness 9, surface roughness 24 ± 2 micro inches). The wrap angle $\theta$ is about 495° and the yarn speed is 700 yards per minute. The yarn is fed to the pin at a tension ($T_1$) of 10 grams by pretension means and is pulled away from the pin by driven rolls under a measured output tension ($T_2$). The yarn tension is measured adjacent to the pin with strain gauges. Between the pretension means and the first strain gauge, the yarn travels for a distance of 39 inches in contact with a heater maintained at the usual texturing temperature for such yarn. The friction coefficient (f) is calculated from the belt equation, $T_2/T_1 = e^{f\theta}$, wherein e is 2.718, the base of natural logarithms, and the other symbols are as indicated above.*

The number of filament cross-sections with a flattened periphery greater than 10 microns in length is determined by microscopic examination of the yarn cross-section. The yarn is embedded in a suitable material and is cut transversely to expose a clear view of the [fialment] *filament* ends. The length of the flattened periphery of the filament cross-sections may be determined by use of a calibrated eyepiece. Preferably, however, a thin transverse slice of the embedded yarn is prepared on a microtome and this is placed on a microscope stage in an immersion oil. Photomicrographs are prepared showing the cross-section at a known magnification. The length of the flattened portions are then measured along a straight line with a ruler on the photomicrograph. The measured values are then converted to actual filament values using the magnification factor. To determine the percent of filaments having cross-sections with a flattened periphery greater than 10 microns, the number of flattened filaments greater than 10 microns is divided by the total number examined and multiplied by 100 to get percent.

Intrinsic viscosities of polymers given in the examples are measured in a solvent consisting of 25 parts by volume of trifluoracetic acid and 75 parts by volume of methylene chloride at 25° C.

Finishes used in Examples I-[VII] *VI* to provide suitable frictional characteristics for acceptable texturing performance are given below. These finishes are diluted with water before application and generally applied in amounts of about 0.8 to 1.4 percent by weight of the yarn (based on the non-aqueous components).

| Finish A | Parts by Weight |
|---|---|
| Isocetyl stearate | 49 |
| Sodium di-(2-ethylhexyl)-sulfosuccinate | 24.5 |
| Condensation product of 1 mole stearyl alcohol with 3 moles of ethylene oxide | 24.5 |
| Triethanolamine | 1 |
| Oleic acid | 1 |

| Finish B | Parts by Weight |
|---|---|
| Coconut oil | 65 |
| Sulfated glyceryl trioleate | 15 |
| Glyceryl mono-oleate | 10 |
| Condensation product of 1 mole nonyl phenol with 5-6 moles of ethylene oxide | 10 |
| Oleic acid | 1 |
| Triethanolamine | 1 |

The number of lobes for the filaments of the invention is in the range 6 to 10. It is difficult to fabricate spinneret orifices to produce filaments having more than 10 lobes, and the differences in glitter and non-glitter filaments are modest and hard to differentiate in filaments with 5 lobes or less. Of course, by reducing the filament denier sufficiently, it is possible to produce glitter-free yarns after texturing regardless of the starting cross-section. However, low-denier multilobal filaments are difficult to produce and are less desirable because they provide fabrics which are too soft and lack crispness. In accordance with the present invention, a soft (uncrisp) hand is avoided by use of yarns in which the denier per filament is greater than 3.8. In addition, as previously disclosed, the filaments must have the proper combination of modification ratio, denier per filament, and number of lobes. The importance of these requirements will become apparent from the examples.

Filaments of the proper denier are prepared by melt-spinning filaments of higher denier and then drawing by known methods to produce filaments with denier in the required range. Since the denier of the original melt-spun filament is equal to the denier of the drawn filament times the draw ratio, one can calculate the denier to be spun once one has determined the optimum draw ratio and the final denier per filament. The drawing operation may occur after melt-spinning as a separate step or may be part of a coupled spinning and drawing operation as in Example 1. [On the other hand, the drawing may be done as part of a unitary draw-texturing process as in Example IX. If one elects a "simultaneous" draw-texturing process, partially oriented yarn is passed over a hot plate where it is both drawn and false-twisted. The filaments in this yarn pass from the hot plate to the twist trap. After passing the twist trap, the filaments are untwisted and the tension is partially reduced as the yarn is wound up.

It should be clear from the above discussion that partially oriented feed yarns for draw-texturing according to the invention must have higher denier per filament than highly oriented feed yarns by a factor equal to the draw ratio used in the draw-texturing operation. While ratio may vary according to tension and other factors, the maximum [ration] *ratio* (R) of output-to-input speed in the draw-texturing operation which is operable without excessive filament breakage is established by testing the feed yarn under a number of draw-texturing conditions. For high-speed spun partially oriented filaments, the ratio (R) is between 1.2 and 2. For slow speed spun partially oriented yarns, the ratio may be as high as 6. For so-called drawn yarns which are highly oriented, the maximum ratio may be as low as 1.1; in practice, such drawn yarns may be overfed to the machine to give an actual operating ratio as low as 0.90. The required denier per filament for partially oriented feed yarns as well as for highly oriented feed yarns is, therefore, between 3.8(R) and (5.88M − 10 + N) (R).]

The following examples illustrate the effect which different combinations of the number of lobes, denier per filament, and modification ratio have on the amount of glitter from flattened surfaces on false-twist textured yarns. Products which meet the specified limits of the invention all have acceptable glitter ratings. Included for comparison therewith are products having unacceptable or borderline glitter ratings; these products have values (underlined in the tables) which are outside of the specified limits.

[Examples I to VIII show feed yarns with a maximum operable output-to-input ratio (R) of about 1.1. Example IX illustrates a feed yarn with a maximum operable ratio (R) of about 2.0]

EXAMPLE I

This example illustrates the preparation of a series of octalobal (N=8) yarns with a range of deniers per filament d and modification ratios M from a copolymer of polyethylene terephthalate containing 2 mole percent of 5-sodium-sulfo-isophthalate units in the polymer chain.

A copolyester having an intrinsic viscosity of 0.53 was melt spun at 280°-300° C. through orifices having 8 slots 0.0035 inch wide and 0.016 inch long symmetrically arranged and radiating from a common point, the length being measured from the common center point. After emerging from the spinneret, the filaments were quenched by a stream of air directed radially inwards against the threadline, the flow of quench air being adjusted to produce the desired modification ratio. The quenched filaments passed over a finish applicator where about 1 percent of Finish B was applied. The bundle of filaments then passed around a feed roll into a steam jet where it was drawn. Several different yarn deniers and filament counts were prepared as shown in Table I. The filament count was varied by using spinnerets with the required number of orifices. The denier per filament was adjusted by adjusting the relationship between extrusion rate and wind-up speed after drawing. Finish B was applied to the drawn yarn before wind-up with pickup of about 0.8 to 1.4 percent by weight based on non-aqueous components.

The drawn yarns were false-twist textured on a Leesona 553 machine having a rotating hollow spindle; the machine being available from Leesona Corporation, Warwick, Rhode Island. The texturing conditions are shown in Table I. In each case the overfeed to the spindle was 1 to 2 percent, and the overfeed to the package was about 12 percent. The resulting yarns were knitted into fabric and the knitted fabric was then dyed a deep purple shade and evaluated for glitter. The results are shown in Table I. The data show that glitter was avoided by increasing the modification ratio and/or decreasing the denier per filament. Knit fabrics prepared from 4.4 denier per filament and 5.5 denier per filament yarns had a dry, crisp hand and high liveliness. On the other hand, knit fabrics from 2.1 denier per filament yarns had a soft hand and low liveliness.

EXAMPLE II

This example describes the results obtained with polyethylene terephthalate yarns having hexalobal cross section and indicates that there is a maximum usable modification ratio beyond which glitter reappears in fabrics made from the textured yarns.

Polyethylene terephthalate having intrinsic viscosities of 0.66 to 0.89 was melt spun as in Example I, except that the spinneret orifices were composed of six equispaced slots radiating from a central point. The slots for the first six [itmes] *items* (Table II) were 0.003 inch wide and 0.018 long while the slots for the seventh item was 0.003 inch wide × 0.024 long. Hexalobal filaments were produced. The modification ratio was adjusted by adjusting quench rate. The yarns were drawn similarly to those in Example I but in an aqueous draw bath at 95° C. rather than in steam. The yarns were false-twist textured on a Leesona 555 machine and knitted into fabrics which were dyed and evaluated for glitter. The results in Table II show that 150/34 yarns give acceptable performance at modification ratios of 1.43 and 1.71, but that unacceptable glitter occurs in fabrics produced from 150/34 yarn having a modification ratio of 2.05.

EXAMPLE III

Polyethylene terephthalate having intrinsic viscosities of 0.66–0.89 was melt spun and drawn as in Example II. The spinneret orifices consisted of eight equally spaced radial slots 0.003 inch wide and 0.018 inch long for items III-1, III-2, III-4, and III-5 shown in Table III. The orifices for III-3 was composed of eight slots 0.003 inch wide and 0.026 inch long. The yarns after spinning and drawing were false-twist textured under the conditions shown in Table III and knit into fabrics. Fiber properties and glitter ratings are shown in Table III.

EXAMPLE IV

Polyethylene terephthalate was melt spun and drawn as in Example II, except that the spinneret orifices were ten equally spaced radial slots. The filaments were decalobal in cross section. These were [false-twisted,] *false-twist textured,* knitted, and dyed. Properties are listed in Table IV. Item IV-1 was produced from spinneret slots of size 0.003 × 0.015 inch and Item IV-2 from slots of size 0.003 × 0.024 inch.

[EXAMPLE V

A series of 150 denier/34 filament yarns (d=4.4) of differing cross sections (round, and N=3, 5, 6, 8 and 10) were prepared from the copolymer of Example I using melt-spinning techniques. The yarns, which are identified in Table V, were false-twist textured on a Leesona 555 machine at the following conditions:

| | |
|---|---|
| Spindle Speed | 210.000 rpm |
| Twist | 60 tpi |
| Temperature | 193° C |
| First Overfeed | 0 |
| Second Overfeed | + 12% |

After texturing, the yarns were knitted into fabrics, dyed and evaluated for glitter. In this series of textured samples, the round trilobal and pentalobal cross-section yarns exhibited objectionable glitter while hexalobal cross-section yarns exhibited objectionable glitter only in the lower modification ratios. All of the octalobal and decalobal yarns were acceptable in their glitter ratings.]

EXAMPLE [VI] *V*

Polyethylene terephthalate was melt spun and drawn as in Example III to produce octalobal yarns having a range of deniers/filament and modification ratios. These were false-twist textured, knitted into fabrics, dyed and evaluated for glitter with the results shown in Table VI.

EXAMPLE [VII] *VI*

Polyethylene terephthalate was melt spun and drawn as in Example II, except that a spinneret containing 50 six-slotted (0.004 × 0.016 inch) orifices was used to produce filaments with a hexalobal cross section which were textured, knitted, dyed, and evaluated for glitter. The results are listed in Table [VII] *VI.*

EXAMPLE [VIII] *VII*

This example illustrates application of the principles of this invention to a copolyester different from that in Example I.

A copolymer of polyethylene terephthalate containing 10 mole percent of ethylene adipate units in the polymer chain, having an intrinsic [visocisity] *viscosity* of 0.75, was melt spun at 305° C. through a spinneret containing 34 orifices each consisting of six equally spaced radial slots of 0.003 × 0.018 inch in size. The yarn passed around a feed roll operating at 1109 ypm, through a draw bath at 92° C. and around draw rolls operating at 3000 ypm and heated to 130° C. About 2 percent of Finish B was applied on the yarn which was found to have the following properties: 75 total denier, 1.66 modification ratio, 3.28 gpd tenacity and 31 percent elongation.

The yarn was textured at 193° C. with 80 turns/inch, a spindle speed of 300,000 rpm and 0 percent first overfeed. The textured yarn was knitted into a fabric, dyed a deep navy blue shade and found to be free from objectionable glitter. Examination of the cross sections of the textured yarn indicated that there were no filaments with flattened sides greater than 10 microns in length.

[EXAMPLE IX

Polyethylene terephthalate was melt-spun as in Example II, from a spinneret having 34 orifices consisting of eight slots 0.0035-inch wide and 0.0112-inch long arranged radially around a center point and intersecting at the center. The denier per filament was adjusted by the relationship between extrusion rate and wind-up speed. The drawability, degree of molecular orientation, and modification ratio were adjusted by control of the quenching air temperature and of the quenching air speed in conjunction with wind-up speed. Partially oriented, 235 denier, 34-filament yarns were obtained which had a break elongation of 112 percent and a tenacity of 2.2 gpd. The filaments had octalobal cross-sections (N=8); the modification ratio M being 1.22 and the denier per filament being 6.9. A finish was applied consisting of an aqueous dispersion of 12 percent by weight of a polyoxyalkylene block copolymer, about 0.1 percent of a surface-active agent, and a basic buffer. The block copolymer contains about 40 percent by weight of oxyethylene groups and 60 percent of oxy-1,2-propylene groups.

The partially-oriented yarns were then draw-textured on a conventional draw-texturing machine (ARCT-480 available from Ateliers Roannais De Construction Textile) and set (second heater) under the conditions shown in Table VIII. The textured yarns were knit into fabrics, dyed, finished, and evaluated for glitter. Yarn properties are shown in Table VIII. All had the glitter rating "A". The yarn 3 had 4 percent of the filaments with a cross-section having a flattened periphery greater than 10 microns in length. The maximum operable ratio (R) of output-to-input for these yarns was about 2. The actual operating draw ratios were somewhat less than 2, as shown in Table VIII]

TABLE I

PROCESS AND PRODUCT DATA FOR EXAMPLE I

| | | Filament Properties | | | | | Texturing Conditions | | | |
|---|---|---|---|---|---|---|---|---|---|---|
| Sample | Yarn Denier/ No. of Filaments | N | d | M | Ten. gpd. | Elong. % | Turn/ Inch | Temp. ° C. | rpm. $\times 10^{-3}$ | Glitter Rating |
| 1-8 | 70/34 | 8 | 2.1 | 1.34 | 3.1 | 30 | 76 | 185 | 195 | A |
| 1-9 | 70/34 | 8 | 2.1 | 1.25 | 3.1 | 30 | 76 | 185 | 195 | A |
| 1-10 | 70/34 | 8 | 2.1 | 1.19 | 3.1 | 39 | 76 | 185 | 195 | A |

TABLE I-continued

PROCESS AND PRODUCT DATA FOR EXAMPLE I

| Sample | Yarn Denier/ No. of Filaments | Filament Properties N | d | M | Ten. gpd. | Elong. % | Texturing Conditions Turn/ Inch | Temp. °C. | rpm. $\times 10^{-3}$ | Glitter Rating |
|---|---|---|---|---|---|---|---|---|---|---|
| 1-11 | 70/34 | 8 | 2.1 | 1.11 | 3.2 | 38 | 76 | 185 | 195 | U |
| 1-12 | 70/34 | 8 | 2.1 | 1.06 | 3.4 | 39 | 76 | 185 | 195 | U |
| 1-1 | 150/34 | 8 | 4.4 | 1.36 | 3.6 | 25 | 60 | 193 | 210 | A |
| 1-2 | 150/34 | 8 | 4.4 | 1.28 | 3.2 | 34 | 60 | 193 | 210 | A |
| 1-3 | 150/34 | 8 | 4.4 | 1.20 | 3.5 | 35 | 60 | 193 | 210 | A |
| 1-4 | 150/34 | 8 | 4.4 | 1.15 | 4.1 | 26 | 60 | 193 | 210 | B |
| 1-5 | 110/20 | 8 | 5.5 | 1.36 | 3.6 | 31 | 65 | 193 | 210 | A |
| 1-6 | 110/20 | 8 | 5.5 | 1.30 | 3.6 | 32 | 65 | 193 | 210 | A |
| 1-7 | 110/20 | 8 | 5.5 | 1.21 | 3.6 | 25 | 65 | 193 | 210 | B |

Note
1: rpm is revolutions per minute
2: Glitter rating A = acceptable Glitter rating B = borderline Glitter rating U = unacceptable

TABLE II

PROCESS AND PRODUCT DATA FOR EXAMPLE II

| Sample | Draw Ratio | Finish | Nominal Yarn Den./ No. of Fils. | Fiber Properties N | M | d | Ten. gpd. | Elong. % |
|---|---|---|---|---|---|---|---|---|
| II-1 | 3.4 | A | 70/34 | 6 | 1.50 | 1.9 | 4.3 | 29 |
| II-2 | 3.5 | A | 70/34 | 6 | 1.30 | 2.1 | 4.2 | 27 |
| II-3 | 3.9 | A | 150/34 | 6 | 1.43 | 4.3 | 4.2 | 29 |
| II-4 | 3.9 | A | 150/34 | 6 | 1.43 | 4.2 | 4.1 | 29 |
| II-5 | 1.8 | B | 150/34 | 6 | 2.05 | 4.5 | 2.3 | 23 |
| II-6 | 2.0 | B | 193/34 | 6 | 1.90 | 6.2 | 1.9 | 57 |
| II-7 | 4.0 | A | 150/34 | 6 | 1.71 | 4.4 | 4.2 | 28 |

| Sample | Texturing Conditions Turns Per Inch | Temp. °C | RPM $\times 10^{-3}$ | Overfeed to Spindle, % | % of filaments with flattened sides > 10μ | Glitter* Rating |
|---|---|---|---|---|---|---|
| II-1 | 68 | 227 | 210 | +2 | 0 | A |
| II-2 | 68 | 227 | 210 | +2 | 0 | A |
| II-3 | 58 | 227 | 210 | +2 | 3 | A |
| II-4 | 58 | 227 | 210 | +2 | 0 | A |
| II-5 | 63 | 227 | 300 | 0 | 29 | U |
| II-6 | 56 | 188 | 160 | −10 | 39 | U |
| II-7 | 60 | 210 | 210 | +1 | 0 | A |

.A = Acceptable; B = Borderline; U = Unacceptable

TABLE III

PROCESS AND PRODUCT DESCRIPTION FOR EXAMPLE II

| Sample | Draw Ratio | Finish | Intrinsic Viscosity | Nominal yarn Den/ No. of Fils. | Fiber Properties N | M | d | Ten. gpd. | Elong. % |
|---|---|---|---|---|---|---|---|---|---|
| III-1 | 2.8 | A | 0.7 | 70/34 | 8 | 1.3 | 2.2 | 3.6 | 31 |
| III-2 | 4.0 | A | 0.7 | 150/34 | 8 | 1.2 | 4.3 | 4.3 | 28 |
| III-3 | 3.8 | A | 0.66 | 150/34 | 8 | 1.47 | 4.3 | 4.1 | 23 |
| III-4 | 4.0 | A | 0.7 | 150/34 | 8 | 1.2 | 4.4 | 4.5 | 29 |
| III-5 | 2.5 | B | 0.89 | 415/34 | 8 | 1.6 | 13.4 | 2.3 | 85 |

| Sample | Texturing Conditions Turns per Inch | Temp. °C. | RPM $\times 10^{-3}$ | First Overfeed | % Filaments with Flattened sides > 10 μ | Glitter* Rating |
|---|---|---|---|---|---|---|
| III-1 | 68 | 227 | 210 | +2 | 0 | A |
| III-2 | 58 | 227 | 210 | +2 | 0 | A |
| III-3 | 60 | 210 | 210 | +1 | 0 | A |
| III-4 | 58 | 227 | 210 | +2 | 0 | A |
| III-5 | 56 | 178 | 100 | −10 | 30 | U |

*A = Acceptable; B = Borderline; U = Unacceptable

TABLE IV

Process and Product Description for Example IV

| Sample | Draw Ratio | Finish | Intrinisic Viscosity | Nominal Yarn Denier/ Number of Filaments | Fiber Properties N | M | d | Ten. gpd | Elong. % |
|---|---|---|---|---|---|---|---|---|---|
| IV-1 | 3.2 | A | 0.7 | 150/34 | 10 | 1.26 | 4.4 | 3.8 | 34 |
| IV-2 | 3.2 | A | 0.7 | 360/34 | 10 | 1.20 | 10.6 | 2.51 | 46 |

| Sample | Texturing Conditions Turns Per Inch | Temp. °C. | RPM $\times 10^{-3}$ | First Overfeed | % Filaments with Flattened sides > 10 μ | Glitter* Rating |
|---|---|---|---|---|---|---|
| IV-1 | 60 | 210 | 210 | +1 | 0 | A |
| IV-2 | 50 | 232 | 144 | −7 | 18 | U |

*A = Acceptable; B = Borderline; U = Unacceptable

[TABLE V

Process and Product Description for Example V

| Sample | Fiber properties N | M | d | Ten. gpd. | Elong. % | Glitter* Rating |
|---|---|---|---|---|---|---|
| V-1 | Round | 1.0 | 4.4 | 3.2 | 32 | U |
| V-2 | 3 | 1.7 | 4.4 | 3.1 | 31 | U |
| V-3 | 5 | 1.3 | 4.4 | 3.1 | 25 | U |
| V-4 | 6 | 1.25 | 4.4 | 3.3 | 30 | U |
| V-5 | 6 | 1.4 | 4.4 | 3.0 | 23 | B |
| V-6 | 6 | 1.5 | 4.4 | 2.9 | 26 | A |
| V-7 | 8 | 1.2 | 4.4 | 3.1 | 17 | A |
| V-8 | 8 | 1.25 | 4.4 | 3.3 | 25 | A |
| V-9 | 8 | 1.35 | 4.4 | 3.4 | 21 | A |
| V-10 | 10 | 1.2 | 4.4 | 3.3 | 23 | A |

*A = Acceptable; B = Borderline; U = Unacceptable ]

TABLE [VI] *V*

Process and Product Description for Example [VI] *V*

| Sample | Draw Ratio | Finish | Fiber Properties N | M | Ten. gpd. | d | Elong. % |
|---|---|---|---|---|---|---|---|
| [VI] *V-1* | 3.4 | B | 8 | 1.46 | 3.47 | 6.2 | 32 |
| [VI] *V-2* | 3.8 | B | 8 | 1.25 | 4.09 | 6.0 | 41 |
| [VI] *V-3* | 3.8 | B | 8 | 1.18 | 3.90 | 5.9 | 42 |
| [VI] *V-4* | 3.8 | B | 8 | 1.09 | 4.05 | 6.3 | 37 |
| [VI] *V-5* | 3.8 | B | 8 | 1.37 | 4.15 | 7.1 | 35 |
| [VI] *V-6* | 3.8 | B | 8 | 1.07 | 3.99 | 3.6 | 34 |

| Sample | Texturing Conditions Turns Per Inch | Temp. °C. | RPM × $10^{-3}$ | First Overfeed | % Filaments with Flattened sides >10 μ | Glitter* Rating |
|---|---|---|---|---|---|---|
| [VI] *V-1* | 60 | 225 | 250 | 0 | 6 | A |
| [VI] *V-2* | 60 | " | " | 0 | 13 | B |
| [VI] *V-3* | 60 | " | " | 0 | 12 | B |
| [VI] *V-4* | 60 | " | " | −10 | 52 | U |
| [VI] *V-5* | 60 | " | " | −10 | 20 | U |
| [VI] *V-6* | 70 | " | " | 0 | 27 | U |

*A = Acceptable; B = Borderline; U = Unacceptable

TABLE [VII] *VI*

Process and Product Description for Example [VII] *VI*

| Sample | Draw Ratio | Finish | Fiber Properties N | M | d | Ten. gpd. | Elong. % |
|---|---|---|---|---|---|---|---|
| [VII] *VI-1* | 3.6 | B | 6 | 1.09 | 2.1 | 3.97 | 34 |
| [VII] *VI-2* | 3.6 | B | 6 | 1.37 | 4.5 | 3.61 | 38 |
| [VII] *VI-3* | 3.6 | B | 6 | 1.4 | 4.6 | 3.70 | 39 |
| [VII] *VI-4* | 3.7 | B | 6 | 1.42 | 5.5 | 3.55 | 40 |

| | Texturing Conditions Turns per | | RPM | First | % Filaments with Flattened sides > 10μ | Glitter* Rating |
|---|---|---|---|---|---|---|
| [VII] *VI-1* | 70 | 225 | 250 | 0 | 19 | U |
| [VII] *VI-2* | 60 | " | " | −10 | 17 | U |
| [VII] *VI-3* | 60 | " | " | −10 | 29 | U |
| [VII] *VI-4* | 60 | " | " | −10 | 24 | U |

*A = Acceptable; B = Borderline; U = Unacceptable

[TABLE VIII

PROCESS AND PRODUCT DATA FOR EXAMPLE IX

| Color | Finish- % on Yarn | Textured Yarn Properties Den | Ten. (g/d) | Elong. (%) | w/Cooling Zone | Turns/ inch | Texturing Conditions (ARCT-480)[1] Temp. of First Heater (° C) | Temp. of Second Heater (° C) | RPM ×$10^{-3}$ | Draw Ratio |
|---|---|---|---|---|---|---|---|---|---|---|
| 1/Brown | 1.0 | 168 | 3.5 | 25 | No | 66 | 210° | 230° | 391 | 1.57X |
| 2/Blue | 1.0 | 171 | 3.5 | 31 | No | 60 | 210° | 230° | 363 | 1.50X |
| 3/Green | 1.0 | 178 | 3.4 | 36 | Yes | 60 | 210° | 230° | 363 | 1.46X |

Note 1: "RPM" is revolutions per minutes ]

I claim:

1. An improvement in multifilament polyester yarn for false-twist texturing [at a maximum ratio (R) of output-to-input of up to 6:1,] wherein the improvement comprises yarn composed of polyester filaments of multilobal cross-section characterized by a total number (N) of 6 to 10 essentially symmetric lobes of substantially equal length, equispaced radially about the center of the filament, and having between 1.17 and 1.85 modification ratio (M), the filaments having a denier per filament between 3.8[(R)] and (5.88M − 10 + N)[(R).] *at M = 1.85.*

2. Yarn as defined in claim 1 wherein said polyester is polyethylene terephthalate.

3. Yarn as defined in claim 1 wherein said polyester is an ethylene terephthalate copolyester containing about 2 mole percent of 5-sodium-sulfo-isophthalate units in the polymer chain.

4. Yarn as defined in claim 1 wherein said polyester filaments have octalobal cross-sections.

5. Yarn as defined in claim 1 wherein said polyester filaments have positive lobe angles.

6. A false-twist textured yarn product of the polyester yarn defined in claim 1, wherein less than 12 percent of the filaments have a flattened cross-sectional periphery of greater than 10 microns and the filaments have a denier per filament between 3.8 and 5.88M − 10 + N[.] *at M = 1.85.*

7. Polyester yarn as defined in claim 6 wherein said polyester is an ethylene terephthalate polymer.

8. Polyester yarn as defined in claim 6 wherein said polyester is an ethylene terephthalate copolyester containing about 2 mole percent of 5-sodium-sulfo-isophthalate units in the polymer chain.

*9. Yarn as defined in claim 1, wherein the yarn contains a finish which provides it with a friction coefficient of less than 0.3 at the texturing temperature.*

*10. Yarn as defined in claim 9 wherein the finish is 0.8–1.4 percent by weight of the yarn of (A) isocetyl stearate, sodium di(2-ethylhexyl)-sulfosuccinate, condensation product of 1 mole stearyl alcohol with 3 moles of ethylene oxide, triethanolamine and oleic acid or (B) coconut oil, sulfated glyceryl trioleate, glyceryl monooleate, condensation product of 1 mole nonyl phenol with 5–6 moles of ethylene oxide, oleic acid and triethanolamine.*

* * * * *

UNITED STATES PATENT OFFICE

CERTIFICATE OF CORRECTION

PATENT NO. : Re. 29,363

DATED : August 23, 1977

INVENTOR(S) : Jerry Bruce McKay

It is certified that error appears in the above-identified patent and that said Letters Patent are hereby corrected as shown below:

Column 11, in Table VI, under column titled "RPM" add

-- X $10^{-3}$ --

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*